No. 782,367. PATENTED FEB. 14, 1905.
C. R. STURDEVANT.
CABLE TERMINAL.
APPLICATION FILED MAR. 25, 1904.
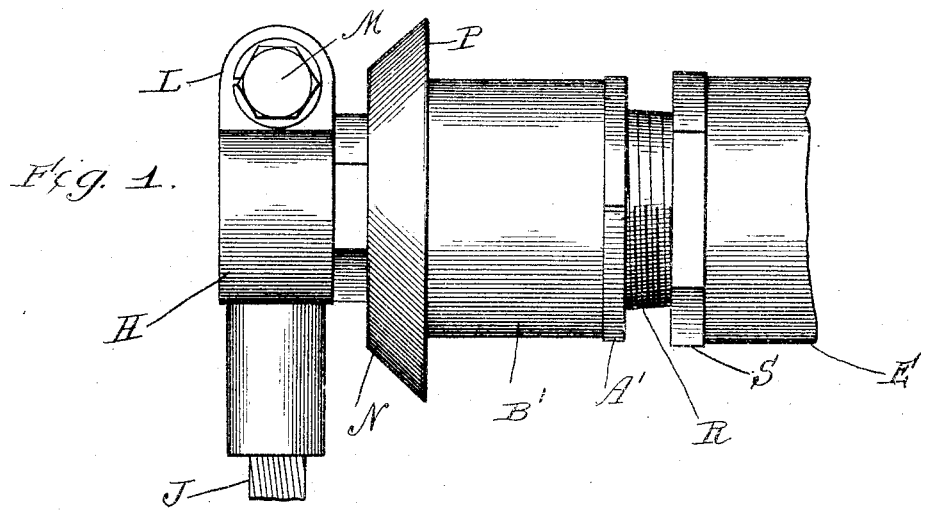
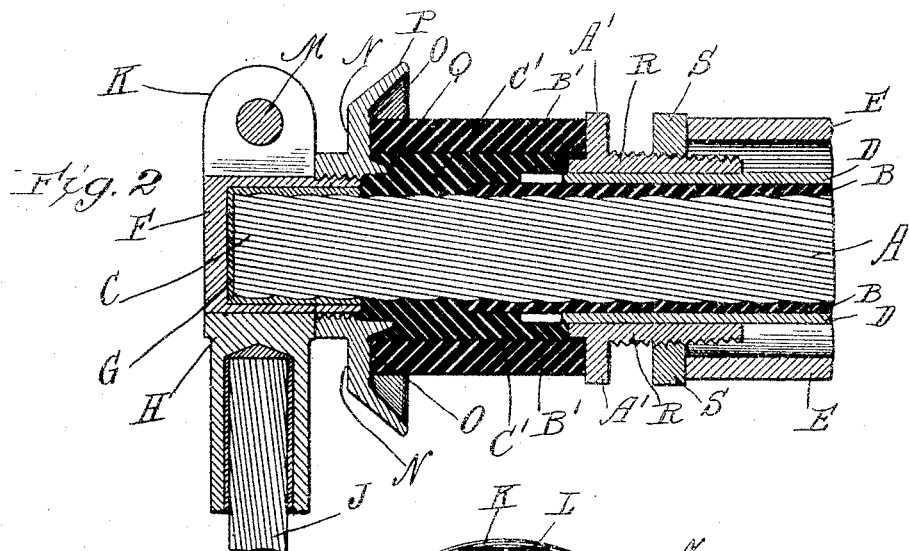
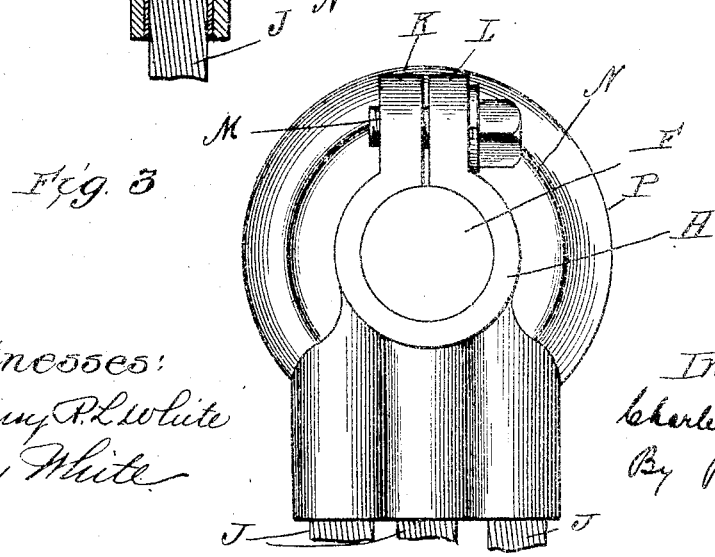
Witnesses:
Harry P. L. White
Ray White
Inventor
Charles R. Sturdevant
By Brown & Darby
Att'ys No. 782,367. Patented February 14, 1905.

UNITED STATES PATENT OFFICE.

CHARLES R. STURDEVANT, OF MANSFIELD, OHIO, ASSIGNOR TO THE OHIO BRASS COMPANY, OF MANSFIELD, OHIO, A CORPORATION OF NEW JERSEY.

CABLE-TERMINAL.

SPECIFICATION forming part of Letters Patent No. 782,367, dated February 14, 1905.

Application filed March 25, 1904. Serial No. 200,001.

*To all whom it may concern:*

Be it known that I, CHARLES R. STURDEVANT, a citizen of the United States, residing at Mansfield, in the county of Richland and State of Ohio, have invented a new and useful Cable-Terminal, of which the following is a specification.

This invention relates to cable-terminals.

The object of the invention is to provide a construction of cable-terminal which is simple and efficient and wherein the parts are afforded ample insulation to prevent leakage of the current.

The invention consists, substantially, in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view in side elevation of a cable-terminal embodying the principles of my invention. Fig. 2 is a view in central longitudinal section of the same. Fig. 3 is a view in end elevation.

The same part is designated by the same reference-sign wherever it occurs throughout the several views.

Heretofore the difficulty of efficiently insulating the ends of cable or other conductors carrying heavy currents in order to prevent leakage of current has given rise to much trouble in the practical use of such cables or conductors, especially in the use of electric railways, wherein the track-rails or third rail constitutes the conductors of the current. In the construction of such railways it is necessary to provide for track-crossings or roadway-crossings, and at such points throughout the length of the line it is necessary to omit sections or portions of the conductor-rails, especially in the case of a surface road, on account of the danger of exposing a live or charged conductor to pedestrians or others using the crossing. It therefore becomes necessary to connect up the end of the section of the conductor-rail on one side of the roadway or crossing to the adjacent end of the section of conductor-rail on the opposite side of the roadway or crossing, and especially in the use of lead-covered cables or conductors employed for bridging these gaps leakage of current wherever it occurs invariably causes electrolytic action of the lead, gradually wearing the same through and exposing the paper, rubber, or other insulating-covering of the cable. Moreover, the collection of dust, dirt, moisture, or the like upon the paper or other insulating medium interposed between the core of the cable and its lead cover is liable to cause arcing between such core and lead covering, thereby causing leakage or burning out the interposed insulating material. These difficulties have been experienced in practice even in the use of cables having their ends or terminals covered or inclosed, and in the case of cables which are required to terminate in the open the difficulty has been materially increased.

It is among the special purposes of my present invention to provide a construction of cable-terminal connection which while simple in its construction and in the arrangement of the parts thereof is efficient in effecting a complete insulation and preventing leakage of current and wherein the interposed insulating medium between the core of the cable and its lead covering is protected against the accumulation of dust, dirt, moisture, and the like, thereby affording protection against the danger of burning out of such interposed insulating material.

In the accompanying drawings I have shown an illustrative form of construction embodying a practical application of my invention, and wherein—

A designates the cable, provided with a paper, rubber, or other insulating-covering B and having its end C exposed in order to afford a means of electrical connection to the conductor or conducting-rail, as will presently be more fully explained.

D designates a lead sheathing or covering for the cable A. This is usually placed over the paper, rubber, or other insulating-covering B, and E designates a pipe-conduit or the like, which is usually placed underneath the railroad-crossing or the intersecting roadway in the case of the use of my invention in this relation and in which the cable is received in order to afford protection against mechanical injury, moisture, dampness, or the like.

F designates a block or casing having a socket or seat to receive the exposed end C of the cable A and in which said exposed end of the cable is soldered, as indicated at G.

H designates a clamp-block or terminal, in which is received the end of the terminal J of the branch or branches of the connectors leading from the conductor and through which electrical connection is established from the conductor to the cable. Clamp-block H is designed and intended to be applied to the casting F in any convenient manner. In the particular form shown, to which, however, I do not desire to be limited or restricted, the clamp-block H is in the form of a split ring having ears K L, adapted to be drawn together by a bolt M or otherwise after said split ring is slipped over the casting F, whereby the clamp-block is efficiently clamped tightly upon the casting F. The casting F is exteriorly threaded for a portion of the length thereof, on which threaded portion is received a dish-shaped or cup sleeve N. This cup-sleeve is provided with a peripheral flange portion O, terminating in a petticoat P, and also with a ring projection Q.

R designates an exteriorly-threaded cone-shaped or tapering clamp-sleeve arranged to be slipped over the end of the cable and upon the exterior surface of the lead covering or sheathing D thereof, and mounted upon this sleeve is a nut S, arranged to bear against the end of the casing conduit or tube E and serving to clamp said sleeve R upon the cable. The clamp-sleeve R is provided with a peripheral flange A′, coöperating with the peripheral flange portion or surface O of cup-sleeve N and presented toward the same. Interposed between the opposed faces or surfaces of laterally-extending flanges O and A′ is a sleeve B′, of suitable insulating material—such, for instance, as rubber, or the like—this insulating-sleeve thus inclosing the end of the cable A between its seat or socket in casting F and the termination of the insulating-covering B or lead sheathing D, and if desired and as shown, the space inclosed between the insulating-sleeve B′ and the cable A may be filled with a suitable insulating compound, as indicated at C′.

The parts may be assembled in any suitable or convenient manner—as, for instance, the casting F is heated. The exposed end C of the cable is then inserted into its seat in said casting and soldered or otherwise suitably fixed therein and while the casting F is still warm. The clamping-sleeve R is slipped over the end of the cable either before or after the exposed end of the cable is fixed or inserted into the socket or seat in casting F, said sleeve R being firmly clamped on the cable by means of nut S and said nut resting against the end of the casing tube or conduit E. The cup-sleeve N is slipped over the casting F and screwed thereon either before or after the operation of securing the end C of the cable in said casting, with the insulating-sleeve B′ previously slipped over the cable and in position for the ends thereof to be received, respectively, against the peripheral flange or surface O of the cup-sleeve and the flange A′ of the clamp-sleeve. Now by turning up on the cup-sleeve N said sleeve is crowded against and into clamping relation with respect to the end of the insulating-sleeve B′, thereby holding the same in place endwise between the flanges O and A′ and insuring against the ingress of dust, dirt, moisture, or the like and the consequent deteriorating effect of electrolytic action or burning out and also preventing leakage of the current.

It will be observed that the ring Q of the cup-sleeve affords means for maintaining in position the insulating compound when inserted or introduced into the space inclosed by the insulating-sleeve B′ and that the petticoat P affords protection against the ingress of moisture, snow, or the like to the joint between the insulating-sleeve B′ and the cup-sleeve N.

Having now set forth the object and nature of my invention and a construction embodying the principles thereof, what I claim as new and useful and of my own invention, and desire to secure by Letters Patent, is—

1. A cable-terminal, comprising a casting adapted to receive the end of the cable, a sleeve mounted upon said casting, a clamp-sleeve mounted upon the cable, and an insulating-sleeve interposed between the ends of said sleeves and having its ends respectively abutting against said first-mentioned sleeve and said clamp-sleeve, and in inclosing relation with respect to the cable and adapted to be clamped between said sleeves, as and for the purpose set forth.

2. A cable-terminal, comprising a casting adapted to receive the end of the cable, a cup-sleeve adjustably mounted upon said casting, a clamp-sleeve mounted upon the cable and having a peripheral flange, an insulating-sleeve interposed between said cup-sleeve and clamp-sleeve and clamped between said cup-sleeve and the flange upon said clamp-sleeve, as and for the purpose set forth.

3. A cable-terminal, comprising a casting adapted to receive the end of the cable, a cup-sleeve mounted thereon, an exteriorly-threaded clamp-sleeve, a nut mounted thereon, and an insulating-sleeve interposed between said cup-sleeve and clamp-sleeve to be clamped therebetween, said insulating-sleeve surrounding the cable, as and for the purpose set forth.

4. A cable-terminal, comprising a casting adapted to receive the exposed end of the cable, and means for connecting said casting electrically to a conductor, in combination with a cup-sleeve mounted upon said casting and provided with a peripheral flange, an exteriorly-threaded clamp-sleeve receiving the cable therethrough and provided with a coöperating peripheral flange, an insulating-sleeve interposed between said peripheral flanges to be clamped therebetween and inclosing the cable, and a nut mounted upon said clamp-sleeve, as and for the purpose set forth.

5. The combination with a conduit or tube, of a cable arranged therein and having its end projecting beyond the same, a clamp-sleeve exteriorly threaded and through which the projecting end of the cable extends, a nut threaded upon said sleeve and bearing against said casing, conduit or tube, a cup-sleeve also receiving the end of the cable therethrough, an insulating sleeve interposed between said cup and clamp-sleeves and inclosing the projecting end of the cable, a casting adapted to receive the end of the cable, and a clamp-ring arranged to be applied to said casting to afford means for electrically connecting the cable to a conductor, as and for the purpose set forth.

6. A cable-terminal comprising a sleeve applied to the cable and affording means for electrically connecting a branch conductor thereto, a clamp-sleeve mounted on the cable, and an insulating-sleeve interposed between the ends of said sleeves and having its ends respectively abutting against said first-mentioned sleeves whereby said insulating-sleeve is clamped therebetween, as and for the purpose set forth.

7. The combination with a cable having a clamp-sleeve slipped over the end thereof, of a conductor-coupling applied to the exposed end of the cable, and an insulating-sleeve inclosing the cable and interposed between said coupling and sleeve, said coupling coöperating with said sleeve to form a clamp to hold said insulating-sleeve endwise therebetween, as and for the purpose set forth.

In witness whereof I have hereunto set my hand, this 19th day of March, 1904, in the presence of the subscribing witnesses.

CHARLES R. STURDEVANT.

Witnesses:
GEORGE A. MEAD,
F. M. PIKE.